US008151016B2

(12) United States Patent  (10) Patent No.: US 8,151,016 B2
McCoy  (45) Date of Patent: Apr. 3, 2012

(54) MECHANICALLY ENERGIZED ELECTROMAGNETIC SERVICE CONNECTOR SYSTEM

(75) Inventor: Richard A. McCoy, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 150 days.

(21) Appl. No.: 12/643,268

(22) Filed: Dec. 21, 2009

(65) Prior Publication Data

US 2011/0153880 A1   Jun. 23, 2011

(51) Int. Cl.
*H05K 5/00* (2006.01)
*H05K 7/00* (2006.01)
*G06F 13/00* (2006.01)
*H02B 1/04* (2006.01)
*H01H 1/58* (2006.01)
*H01R 13/70* (2006.01)
*H01R 25/14* (2006.01)

(52) U.S. Cl. .............. 710/33; 361/632; 361/679.01; 200/51 R

(58) Field of Classification Search .............. 710/33
See application file for complete search history.

(56) References Cited

U.S. PATENT DOCUMENTS

| | | | |
|---|---|---|---|
| 3,101,984 A | 8/1963 | Wieckmann | |
| 4,148,536 A | 4/1979 | Petropoulsos et al. | |
| 4,591,732 A | 5/1986 | Neuenschwander | |
| 4,604,505 A * | 8/1986 | Henninger | 200/50.3 |
| 5,385,468 A | 1/1995 | Verderber | |
| 5,433,623 A | 7/1995 | Wakata et al. | |
| 5,713,752 A | 2/1998 | Leong et al. | |
| 6,176,718 B1 | 1/2001 | Skarie et al. | |
| 6,428,334 B1 | 8/2002 | Skarie et al. | |
| 7,024,717 B2 | 4/2006 | Hilscher et al. | |
| 7,207,080 B2 | 4/2007 | Hilscher et al. | |
| 7,354,292 B1 | 4/2008 | Lloyd et al. | |
| 8,008,586 B2 * | 8/2011 | Kuehl et al. | 200/51 R |
| 2004/0154318 A1 | 8/2004 | Roh et al. | |
| 2006/0168236 A1 | 7/2006 | Higuma et al. | |
| 2008/0165476 A1 | 7/2008 | McCoy et al. | |
| 2008/0287009 A1 * | 11/2008 | McCoy | 439/676 |
| 2011/0147161 A1 * | 6/2011 | Kuehl et al. | 192/82 R |
| 2011/0148223 A1 * | 6/2011 | McCoy | 307/116 |
| 2011/0149485 A1 * | 6/2011 | Kuehl et al. | 361/679.01 |

FOREIGN PATENT DOCUMENTS

| | | |
|---|---|---|
| EP | 0868077 A2 | 9/1998 |
| JP | 60033716 A | 2/1985 |
| JP | 06310202 A | 11/1994 |
| JP | 06310204 A | 11/1994 |
| JP | 06333633 A | 12/1994 |
| JP | 2007080584 A | 3/2007 |
| WO | 2007/015274 A1 | 2/2007 |

* cited by examiner

*Primary Examiner* — Chun-Kuan Lee
*Assistant Examiner* — Brooke Dews
(74) *Attorney, Agent, or Firm* — McGarry Bair PC; Robert A. Bacon

(57) ABSTRACT

A system for communicating an electromagnetic service, such as power or data, with an electromagnetic service communicating device. An electromagnetic service switch is provided for selectively transferring the electromagnetic service from a host or other electromagnetic service source to an electromagnetic service consumer. The electromagnetic service switch is activated to transfer the electromagnetic service from the electromagnetic service source to the electromagnetic service consumer in response to movement of a component associated with the electromagnetic service source.

39 Claims, 5 Drawing Sheets

MECHANICALLY ENERGIZED ELECTROMAGNETIC SERVICE CONNECTOR SYSTEM

BACKGROUND

Traditionally, appliances, consumer electronics devices, and other useful household equipment are located in a room dedicated to the function supported by the appliance, consumer electronic device, and/or household equipment. For example, the kitchen has traditionally been limited to a space for preparing and eating meals and consequently has mostly been occupied by cabinetry and large home appliances such as refrigerators, dishwashers, and ovens. The family room has been designated as a place for leisure activities, and so most entertainment devices, such as televisions and video games are commonly found here. Laundry rooms normally house a washer, dryer, and iron. Devices such as personal computers and printers are often located in another room, such as a dedicated home office or bedroom.

Consumers increasingly own multiple hand-held or portable consumer electronic devices, such as laptops, cell phones, PDA's, and digital music players. These devices are typically used in many different rooms in the house and are often carried from room to room throughout the home. Consumers also tend to perform nontraditional tasks in the traditional rooms of the home. For example, consumers also tend to eat in the living room or media room, instead of the dining room. Consumers tend to eat, meet and entertain in the kitchen, not just in the dining room and family room. In fact, the kitchen is often the hub of most household activity. Consumers also tend to work in every room of the home with the adoption of laptop computers and wireless networks. Therefore, there is a trend for consumers to perform non-traditional functions in a household room designed for a traditional function. The present invention recognizes this trend and attempts to support the trend.

BRIEF SUMMARY

The invention relates to electromagnetic service connector systems for connecting portable devices to a host.

According to one aspect of the invention, a system for coupling with an electromagnetic service communicating device comprises an electromagnetic service connector system. The electromagnetic service connector system comprises an electromagnetic service receptacle, an electromagnetic service switch operably connected to an electromagnetic service source, the electromagnetic service switch operable for selectively transferring an electromagnetic service from the electromagnetic service source to the electromagnetic service receptacle, a first actuating link moveably associated with the electromagnetic service switch, an electromagnetic service plug operably connectable to the electromagnetic service receptacle, and a second actuating link moveably associated with the electromagnetic service plug and engageable with the first actuating link, wherein the electromagnetic service switch is selectively activated to transfer an electromagnetic service from the electromagnetic service receptacle to the electromagnetic service plug in response to movement of the second actuating link.

According to another aspect of the invention, a system couples with an electromagnetic service consumer comprising a first electromagnetic service connector component, and comprises a second electromagnetic service connector component operably engageable with the first electromagnetic service connector component for transferring an electromagnetic service from an electromagnetic service source to the first electromagnetic service connector component, and an electromagnetic service switch for selectively connecting the second electromagnetic service connector component to the electromagnetic service source, the electromagnetic service switch including a first actuating link engageable with the first electromagnetic service connector component, wherein the electromagnetic service switch is activated to transfer an electromagnetic service from the electromagnetic service source to the second electromagnetic service connector component in response to movement of the first actuating link.

According to yet another aspect of the invention, an electromagnetic service connector component receives an electromagnetic service from a host and comprises an electromagnetic service plug operably engageable with a separate second electromagnetic service connector component for selectively receiving an electromagnetic service from an electromagnetic service source, and an actuator operably associated with the electromagnetic service plug, the actuator moveable along a path generally parallel to an axis of insertion of the electromagnetic service plug with the second electromagnetic service connector component, between a first position and a second position, wherein the electromagnetic service is delivered to the electromagnetic service plug when the actuator is in the first position.

According to still another aspect of the invention, an adapter removably couples a portable device having a first device electromagnetic service connector component to a host having an electromagnetic service provider, a first host electromagnetic service connector component, and an electromagnetic service switch selectively providing an electromagnetic service to the first electromagnetic service connector. The adapter comprises a second host electromagnetic service connector component engageable with the first host electromagnetic service connector component, a second device electromagnetic service connector component engageable with the first device electromagnetic service connector component, an electromagnetic service line operably interconnecting the second host electromagnetic service connector component and the second device electromagnetic service connector component for the transfer of an electromagnetic service therealong, and a first actuating link engageable with a second actuating link associated with the electromagnetic service switch, wherein the electromagnetic service switch is activated in response to movement of the first actuating link.

DETAILED DESCRIPTION

Figure 1:
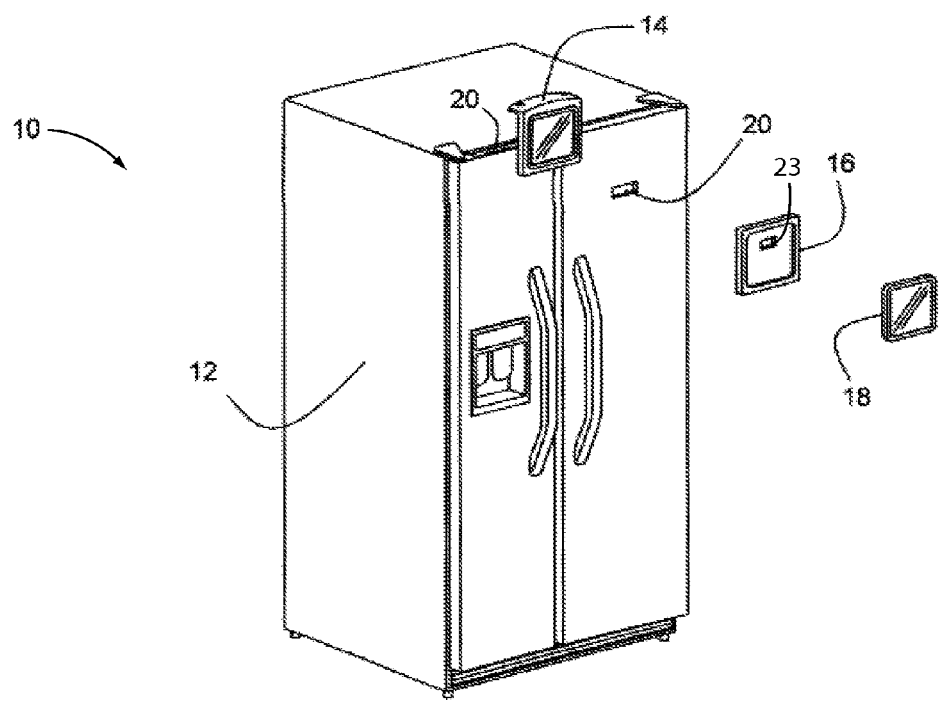
FIG. 1 is a perspective view of a modular system according to one embodiment of the invention employing a mechanically energized electromagnetic service connector system for connecting an accessory device to a host.

Referring now to the discussion that follows and to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or to otherwise limit or restrict the claims to the precise forms and configurations shown in the drawings and disclosed in the following detailed description.

The drawings and the below detailed description relate generally to systems of electromagnetic service connector components for coupling an electromagnetic service provider with an electromagnetic service consumer. The following definitions apply to terms that may be used in the specification and the claims, unless otherwise noted.

As used herein, an "electromagnetic service" is electrical power or data. An electromagnetic service may comprise multiple categories of service, such as electrical power and data in a single signal. An electromagnetic service may be provided continuously, for specified times, for specified amounts, or for the duration of certain events, such as the duration of coupling to provide timed dispensing. Alternatively, an electromagnetic service may be provided in quanta, such as packets of data.

The term "coupled" and any variation thereof, as used herein, includes any type of connection that permits transfer of a service, as hereinafter defined, between two devices. The term "coupled" does not require a physical connection between the two devices so long as the coupling permits transfer of a service. The term "coupled" includes both fixed and removable coupling, as well as both continuous and intermittent coupling.

"Wireless" refers to a type of communication in which power and/or data is transferred over a distance without the use of electrical conductors or wires. For example, electromagnetic waves, light waves, or acoustic waves can be used to carry power and/or data over a distance without using electrical conductors or wires.

"Electrical power communication" is the coupling of two devices to supply electrical power from at least one of the devices to the other of the devices, such as through directly connected electronic lines or through wireless power communication (also referred to as wireless power transmission). Wireless power communication may include any types of wireless power communication, including, without limitation for illustration purposes, microwave transmission, laser transmission, and magnetic fields. Exemplary categories of power communication include the type of power, e.g., alternating current (also known as AC) or direct current (also known as DC), supplied to the functional device and variations in the characteristics of the power, such as the voltage or current.

"Data communication" is the coupling of two devices to transmit data from at least one of the devices to the other of the devices, such as through directly connected electronic lines or through wireless data communication (also referred to as wireless data transmission). The data may be transmitted as a separate signal or embedded in electrical power communication. Wireless data communication may include any type of wireless data communication, including, without limitation for illustration purposes, wireless network (a/k/a Wi-Fi), radio transmission, light transmission, and acoustical transmission. Exemplary categories of data communication include encrypted and unencrypted data. Data communication also includes communication for different protocols, including physical layer protocols and software layer protocols. Examples of physical layer protocols are a wired Ethernet and a wireless (Wi-Fi) network, both of which may support the same data packet structure. Examples of software layer protocol are Zigbee® and Bluetooth®. Data communication may also be completed by way of an analog mechanical transmission means such as by means of fluidic pulses created by positive pressure systems or vacuum systems or by a mechanical logic transfer means, such as the throwing of switches or levers to actuate or transmit information about a control state.

"Communicating" an electromagnetic service, and any variation thereof, as used herein, means supplying or receiving an electromagnetic service. As used herein, communication of electromagnetic service includes both uni-directional and multi-directional communication between any two devices, either directly or through an adapter, as defined herein.

The terms "provide" and "supply" and any variation thereof, are used herein to denote a source of the electromagnetic service relative to a device receiving the electromagnetic service. Neither term is limited to the original source of the electromagnetic service. A device that provides or supplies the electromagnetic service may simply be passing on the electromagnetic service from the original source, such as a residential power utility system or the internet. For example, a device that provides an electrical power service may pass on electricity it receives from a household outlet. However, the device may, alternatively or additionally, provide another electromagnetic service that originates with the device, such as a data service.

The term "receive" and any variation thereof, is used herein to denote receipt of the electromagnetic service relative to the device providing the electromagnetic service. The term is not limited to the ultimate consumer of the service. A device that receives the electromagnetic service may simply be passing on the electromagnetic service from the source, such as an appliance, to a device that will consume, as hereinafter defined, the electromagnetic service. The device that receives an electromagnetic service is not necessarily the end consumer of the electromagnetic service.

The term "consume" and any variation thereof, as used herein, denotes the act of employing or dispensing at least a portion of the electromagnetic service received in connection with performing a function, such as using a power service to operate a speaker or video display.

A "useful device" as used herein is a device that is capable of performing a useful physical or virtual function alone or in combination with another device.

An "electromagnetic service consumer" as used herein is any useful device that employs or dispenses an electromagnetic service in connection with performing a physical or virtual function. An electromagnetic service consumer may be, for example, a consumer electronic device, a client software device, a remote user interface, a source of consumer information, a reader, such as a bar code, optical scanner or RFID reader, a sensor device, a smart utensil, an appliance, an additional smart coupling device, a remote controller, a network binder, a cycle accessory, a resource controller, such as an energy controller, a communicator, such as an audible accessory, an access or payment system, such as a smart card system permitting access to a host device, a sales demonstration device, an electromagnetic service holder, such as a battery, a dispenser, a media content holder, or an electromagnetic service device, such as a laptop or other service client.

An "electromagnetic service provider" as used herein is any useful device that is capable of providing or supplying an electromagnetic service to another device.

An "electromagnetic service communicating device" as used herein is any useful device that is capable of communicating an electromagnetic service with another device, and may be an electromagnetic service provider or an electromagnetic service consumer.

A "host" as used herein is an electromagnetic service provider that has a primary function independent of providing an electromagnetic service. For example, the host may be an appliance and the primary function may be performing a series of steps to conduct a useful cycle of operation. The appliance may be a conventional household appliance, such as a refrigerator performing a cooling cycle or an ice making cycle. Other examples of appliances that may be hosts include, but are not limited to, a freezer, a conventional oven, a microwave oven, a dishwashing machine, a stove, a range, an air conditioner, a dehumidifier, a clothes washing machine, a clothes dryer, a clothes refreshing machine, and a non-aqueous washing apparatus, or any combination thereof. Alternatively, the host may be a fixture such as a water softener, a water heater, a furnace, pool water treatment equipment, or an HVAC system. The host may be a small device such as a thermostat, a blender, a mixer, a toaster, a coffee maker, an air purifier, an iron, a vacuum cleaner, a robot, or a trash compactor. The host may alternatively comprise a structural feature of a building, such as a wall, a cabinet, or a door. The host may also provide other services, such as mechanical power, illumination, heat, or sound. The host may be an electromagnetic service consumer. For example, a host may provide a power service while receiving or while receiving and supplying a data service.

A "functional device" as used herein is a useful device that may be an electromagnetic service provider, an electromagnetic service consumer, or both.

As used herein, the terms "accessory" or "accessory device" refer to any useful device that may be used primarily in conjunction with a host to enhance, supplement, regulate or monitor the functionality of the host. An accessory device may be a service provider, a service consumer, or both. Examples of an accessory device include, but are not limited to, a television, a video camera, a video recorder, a personal computer, a notebook computer, a computer monitor, a video display, a keyboard, a printer, copying equipment, a calculator, a facsimile machine, a scanner, a digital storage device, a wireless transceiver, an internet router, a power supply, a data recorder, an answering machine, a telephone, a cordless telephone, a cellular telephone, a video game system, a personal digital assistant, a DVD player, a VHS player, a VCR, a cassette deck, an 8 mm video player, a CD player, a Blackberry®, a smartphone, a smoke detector, a portable digital video player, an MP3 player, a radio, other music players, an audio speaker, a digital picture frame, a weather station, and a scale or balance.

A "portable device" as used herein is a device that is designed to be moveable by a user during its useful life between a use location and a storage location or alternative use location. A portable device can be an accessory device.

An "independent device" as used herein is a useful device that provides a useful function without being connected to an electromagnetic service provider. In some cases, the primary function of the independent device is different from the primary function of a host from which the independent device may receive a service. The independent device may be an accessory device, such as portable communication, entertainment, informational or educational devices.

A "dependent device" as used herein is a useful device that provides a useful function only when connected to an electromagnetic service provider. A dependent device may be a dependent electromagnetic service consumer. Examples of dependent electromagnetic service consumers that may be coupled to a host include a remote user interface (UI), a consumable reader, a cooking sensor, a smart pan or pot, a smart dimmer, a cycle accessory, an energy controller, an audible accessory, a laundry payment or smart card system, a sales demonstration unit, and an electromagnetic service laptop or other electromagnetic service client.

An "electromagnetic service connector system" as used herein is a connector system having at least two separate electromagnetic service connector components, each associated with a useful device. The electromagnetic service connector components cooperate with one another to couple the useful devices to facilitate communication of an electromagnetic service between the useful devices. A service connector system may carry multiple services.

A "switched electromagnetic service connector system" as used herein is an electromagnetic service connector system having a switching capability in at least one of the electromagnetic service connector components operable to selectively permit the communication of an electromagnetic service between the components of the electromagnetic service connector system. Since a service connector system may carry multiple services, a switched electromagnetic service connector system may selectively permit the communication of different services.

An "electromagnetic service switch" as used herein is a switch used to selectively permit the communication of an electromagnetic service between components of an electromagnetic service connector system. An electromagnetic service switch may be associated with more than one type of service.

A "plug" as used herein is a generally male electromagnetic service connection component.

A "receptacle" as used herein is a generally female electromagnetic service connection component.

An "electromagnetic service pathway" as used herein is any pathway, such as an electromagnetic service line for power or data, for transferring an electromagnetic service from one location to another. The electromagnetic service line may have any of a variety of configurations depending on the type of electromagnetic service being transferred, including, but not limited to, a pipe, a conduit, a wire, a tube, a channel, a fiber optic cable, and a mechanical linkage. For example, to transfer electrical power or data service communication, an electromagnetic service pathway may be an electromagnetic service line such as an electrically conductive wire, an optical data cable, or a wireless transmission system.

A "proximity target" as used herein is any component or device that may be detected when positioned within a predetermined distance of an associated proximity sensor, defined below. A proximity target may be passive, such as a visual target or a magnetic target formed of magnetic or magnetic responsive material. Other examples of passive proximity targets may include a conductive component or surface capable of cooperating with a magnetic field, a current, or a voltage provided by a proximity sensor. A proximity target may alternatively be active or powered such as an electromagnet, a generator of a magnetic field, a current, a voltage or an acoustic wave. An active proximity target may alternatively provide a powered readable display or dispense a detectable chemical.

A "proximity sensor" as used herein is any component or device that may detect an associated proximity target when the proximity target is within a predetermined distance of the proximity sensor. A proximity sensor may detect, for example, a change in an electromagnetic field, an electromagnetic wave, an acoustic wave, a visual target, a chemical component, an electrical signal, a change in voltage, a change in current, a change in frequency, a change in resistance, a change in inductance, a change in capacitance, a mechanical signal, a change in pressure, a displacement, a vibration, and the presence of a chemical, A proximity sensor may be active or passive, such as a magnetic sensor of magnetic or magnet responsive material, or may alternatively be active. Examples of active sensors include active magnetic sensors, light sensors, optical sensors, acoustic sensors, electromagnetic sensors, chemical sensors and thermal sensors. Examples of magnetic sensors include magnets and magnetic responsive components. Examples of optical sensors include infrared sensors, photoelectric sensors, fiber optic sensors, photo resistors, photovoltaic sensors, photo diodes and cameras. Examples of electromagnetic sensors include radio receivers, radar sensors, Hall Effect sensors, inductive sensors, capacitive sensors, variable reluctance sensors and eddy current sensors. Examples of acoustic sensors include ultrasonic sensors and microphones. A contact proximity sensor detects a proximity target by touching the proximity target. A contactless proximity sensor detects the proximity target through a wireless or contactless means. For example, magnetic flux can be used as the signaling mechanism between a contactless proximity sensor and a contactless proximity target.

As used herein, the term "proximity system" is a system that uses a "proximity switch" operated by a plurality of "proximity coupling components," each associated with a different parent device, for determining that the parent devices are in proximity with each other. Parent devices are usually paired, examples of which include a service provide and a service consumer, a host and an accessory device, and a host and an adapter. Proximity coupling components may include a proximity target associated with one parent device to actively or passively provide an indication of the presence of the one parent device and a proximity sensor associated with the other parent device, responsive to the presence of the proximity target to activate the proximity switch. The proximity switch may be used to provide a signal or message indicative of the proximity of two parent devices or may directly or indirectly regulate the flow of a service along a service line.

An "adapter" as used herein is an intermediate device that may be provided between a first and second useful device, such as between a host and an accessory, to facilitate the communication of services between the first and second useful devices. An adapter may receive an electromagnetic service from the first useful device and provide a modified version of the electromagnetic service to the second useful device, for example, by providing an electrical power service using a different voltage or providing a data service using a different data structure or signal type. In some applications, multiple adapters may be interposed between two useful devices. In other applications, three or more useful devices may be coupled to a single adapter, such as between a host and two accessories. In some applications, the adapter may itself be a functional device providing a useful function not provided by the useful devices coupled to it. An adapter may optionally include a transformative component that transforms a service from a service provider to a different service, which is supplied to a service consumer. This may be useful when the service from the service provider is not compatible with the service consumer. The transformative component can be configured to transform the service into a compatible form for the service consumer. Examples of transformative components are protocol converters, power transformers, or other devices that convert substance, energy, or data from a first form to a second form.

A "functional unit" as used herein is any adapter coupled to a useful device, which together provide a functionality that neither the adapter nor the useful device may alone provide. Any functional unit itself is also included within the meaning of the term "useful device". In some cases, it is contemplated that a dependent device may be coupled with an adapter that provides one or more services required by the dependent device to enable the functional unit to provide a useful function, in which case the functional unit also constitutes an independent device.

A "storage device" as used herein is any device capable of receiving a service, storing the service, and selectively dispensing the service. A storage device may include, for example, s battery, a capacitor, a hard disk drive, an optical disc, such as CD, DVD, or Blue-ray Disc, a floppy disk, a ZIP disk, a minidisk, a solid state semiconductor memory, such as xD-Picture card, a MultiMediaCard, a USB flash drive, SmartMedia, an SD card, a miniSD card, an SDHC card, a microSD card, a TransFlash card, a CompactFlash I or II, a Secure Digital, or a Sony Memory Stick.

A "conversion device" as used herein is any device capable of converting the form of an electromagnetic service, or converting one electromagnetic service to another service. Examples of a conversion device include, but are not limited to, a generator, a motor, a piezoelectric device, a pneumatic device, an inverter, a lens, a filter, a prism, a transmitter, a speaker, and a resonator.

Figure 2:
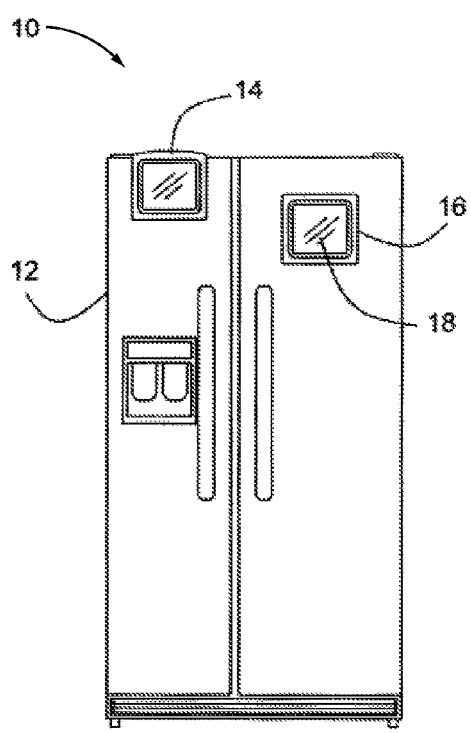
FIG. 2 is a front elevational view of the modular system of FIG. 1, showing the accessory devices attached to the host.
Figure 3:
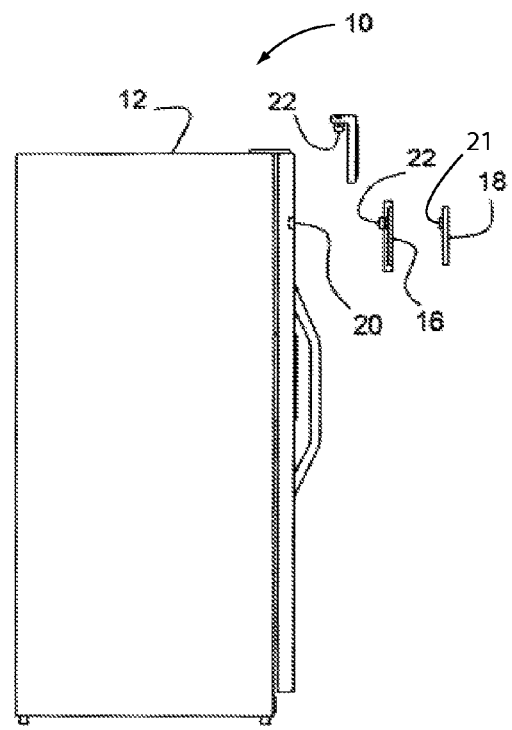
FIG. 3 is a side elevational view of the modular system of FIG. 1, showing the accessory devices removed from the host.

Referring now to FIGS. 1-3, a schematic illustration of a modular system 10 according to one embodiment of the invention is shown to include at least one electromagnetic service provider and at least one electromagnetic service consumer. As illustrated herein, the electromagnetic service provider is a host 12 and at least one electromagnetic service consumer is an accessory device 14 that may be coupled to host 12.

The accessory device 14 may be either directly or indirectly coupled to host 12. Direct coupling occurs when accessory device 14 includes an electromagnetic service connector component suitably configured for engaging a corresponding electromagnetic service connector component of host 12 to establish an electromagnetic service pathway between the host 12 and the accessory device 14. The electromagnetic service pathway provides a line for transferring at least one electromagnetic service from host 12 to accessory device 14 and from accessory device 14 to host 12.

An adapter 16 may be provided for coupling a second accessory device 18 having an incompatible electromagnetic service connector component to host 12. An electromagnetic service connector component is incompatible if it cannot be directly coupled to a corresponding electromagnetic service connector component, such as when the incompatible electromagnetic service connector component lacks certain physical features that would enable the electromagnetic service connector component to engage the corresponding connector component to establish an electromagnetic service pathway. Adapter 16 may include an electromagnetic service connector component that may be directly coupled with the electromagnetic service connector component of host 12 and a second electromagnetic service connector component that may be directly coupled with the incompatible electromagnetic service connector component of accessory device 18, thereby establishing an electromagnetic service pathway between host 12 and accessory device 18.

Although accessory device 14 is shown coupled to an upper surface of host 12, whereas accessory device 18 is shown attached to a front surface of host 12 by way of adapter 16, it shall be appreciated that in practice, accessory device 14 and adapter 16 may be suitably configured for coupling to host 12 in any desired location and manner in order to accommodate the design and performance requirements of a particular application.

Host 12 may perform a primary function. As illustrated in the figures, host 12 is a refrigerator performing a cooling cycle and/or an ice making cycle. Although the figures show an appliance comprising a refrigerator, it shall be understood that the invention is not limited to refrigerators or appliances in general.

Accessory devices 14 and 18 may also perform at least one primary function. The primary functions of accessory devices 14 and 18 can be different from the primary function performed by host 12, although they need not be.

Host 12 may be configured to provide or receive at least one electromagnetic service to or from accessory devices 14 and 18. Similarly, accessory devices 14 and 18 may also be configured to provide or receive at least one electromagnetic service to or from host 12. It is not necessary that the electromagnetic service transferred between host 12 and accessory devices 14 and 18 be used in performing the primary function of host 12 or accessory devices 14 and 18, or otherwise be related to the primary function of either accessory device.

As mentioned previously, in instances where the accessory device includes an incompatible electromagnetic service connector component that prevents direct coupling of the accessory device to host 12, adapter 16 may be provided for indirectly coupling the accessory device to host 12. Adapter 16 operates to establish an electromagnetic service pathway for transferring the desired electromagnetic service between host 12 and accessory device 18 having the incompatible electromagnetic service connector component.

At least one electromagnetic service may be supplied to accessory devices 14 and 18 from host 12, or from accessory devices 14 and 18 to host 12. The supply of the electromagnetic service may be uni-directional in that either host 12 supplies the electromagnetic service to accessory devices 14 and 18 or accessory devices 14 and 18 supply the electromagnetic service to host 12. The supply of the electromagnetic service may also be bi-directional in that the supplied electromagnetic service may be delivered from host 12 to accessory devices 14 and 18 and from accessory devices 14 and 18 to host 12.

Exemplary electromagnetic services that may be transferred between host 12 and accessory devices 14 and 18 may include electrical energy, and data communication, among others. Data communication may include the transfer of information by way of appropriate transfer media including but not limited to electrical, electromagnetic wave, acoustic and optical data between host 12 and accessory device 14. For example, host 12 may include a modem for enabling internet access to the World Wide Web. Accessory device 14 may also include an electronic device, such as a computer, PDA, digital music player, among others, which when coupled to host 12 may access various forms of data available from the World Wide Web through the modem and have the data transferred from host 12 to accessory device 14. Electrical energy may include electric current such as alternating current, direct current, or both. Electric current may, for example, be transferred from host 12 to accessory device 14 for powering the accessory device 14. It is not necessary that host 12 be the source of the electric current. Host 12 may be operating as a conduit for transferring electric current received from an outside source, such as a residential power system of a electrical service provider. It shall be appreciated that these are only a few examples of the various types of electromagnetic services that may be transferred between host 12 and accessory devices 14 and 18.

It will further be appreciated that, while the exemplary embodiments in the drawings illustrate specific types of exemplary electromagnetic service communicating devices, such as a host 12 that may operate and an electromagnetic service provider, a accessory device 14 that may operate as an electromagnetic service consumer, and an adapter 16 that may act as a conduit for the transfer of electromagnetic service from host 12 to accessory device 18, variations from this configuration are possible. These variations include systems with only two electromagnetic service communicating devices, systems with more than three electromagnetic service communicating devices, systems where any of the devices may be service consumers and/or service providers, systems where multiple services are communicated and systems where services are received by one device, converted in some manner, and then passed to a third device. Furthermore, in the following description, certain components of connector systems and proximity systems are described for the illustrative purposes as being associated with specific exemplary electromagnetic service communicating devices. For example, a proximity switch, target or sensor may be described as being located in a service provider, service consumer, host or portable device. It will be appreciated that these system components may be alternatively assigned to the various electromagnetic service communicating devices depending on the application.

Host 12 and accessory device 14 may each comprise at least one electromagnetic service connector component, respectively referred to herein as a host electromagnetic service connector component 20 and a device electromagnetic service connector component 22. Host electromagnetic service connector component 20 and device electromagnetic service connector component 22 have complementary configurations that enable the electromagnetic service connector components to be coupled to one another, thereby establishing an electromagnetic service pathway over which desired services may be transferred between host 12 and accessory device 14.

Host 12 also has a second host electromagnetic service connector component 20 provided on its front surface for a first device electromagnetic service connector component 22 provided on the adapter 16. In instances where the accessory device includes an incompatible electromagnetic service connector, and the adapter 16 is used as an intermediate component to connect a accessory device 18 to a host 12, then adapter 16 will have a second device electromagnetic service connector component 23 for engagement with a device electromagnetic service connector component 21 of accessory device 18 as well as the first device electromagnetic service connector component 22 for connection with the host electromagnetic service connector component 20 of host 12. Therefore, device electromagnetic service connector component 22 may have the same general configuration whether included as part of accessory device 14 or adapter 16, and host electromagnetic service connector component 20 may have the same general configuration whether it couples directly with a accessory device or an adapter. Accordingly, for purposes of discussion, the various features and operation of electromagnetic service connector component 22 will hereinafter be described in connection with accessory device 14, but it shall be appreciated that exemplary device electromagnetic service connector component 22 may also be used in conjunction with adapter 16.

Host electromagnetic service connector component 20 may be integrally formed with host 12 or may be an add-on device. For purposes of discussion, host electromagnetic service connector component 20 is shown integrally formed with host 12. When configured as an add-on device, host electromagnetic service connector component 20 may also function as an adapter to enable a host and a accessory device having dissimilar electromagnetic service connector components to be indirectly coupled to one another. Host electromagnetic service connector component 20 may be removable or non-removable from host 12. Host electromagnetic service connector component 20 may be configured to transfer or receive a single electromagnetic service or multiple electromagnetic services.

Figure 4:
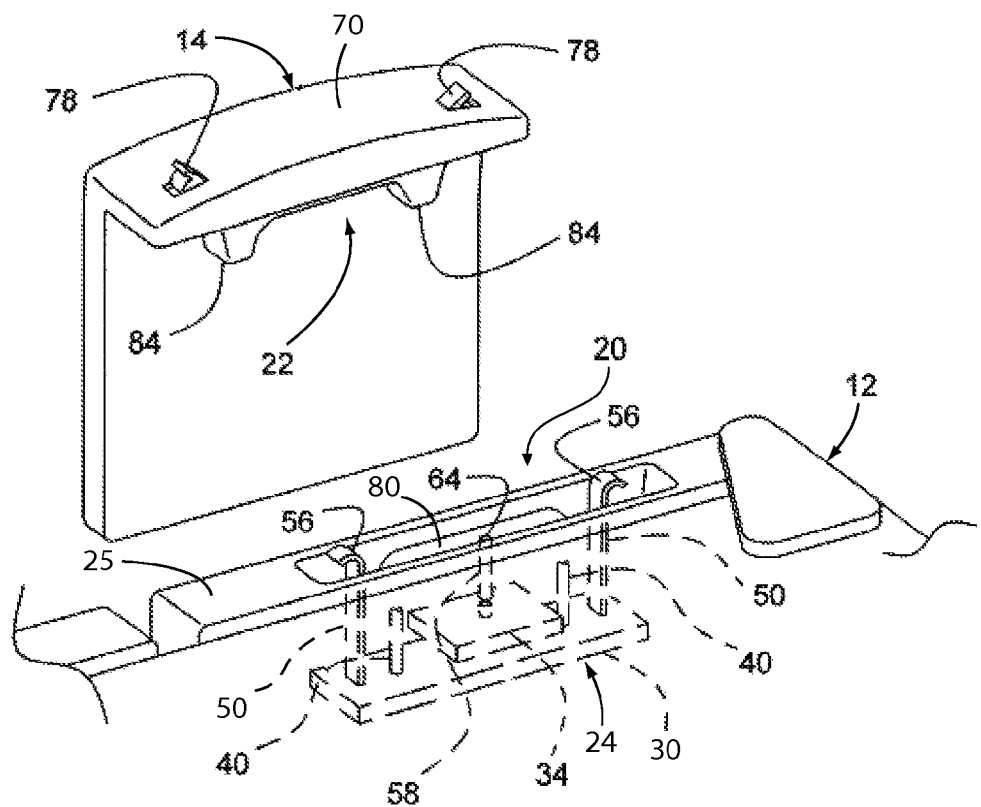
FIG. 4 is partial top rear perspective view of the modular system of FIG. 1 with the accessory device removed from the host, showing a host portion of the mechanically energized electromagnetic service connector system, with portions shown schematically.
Figure 5:
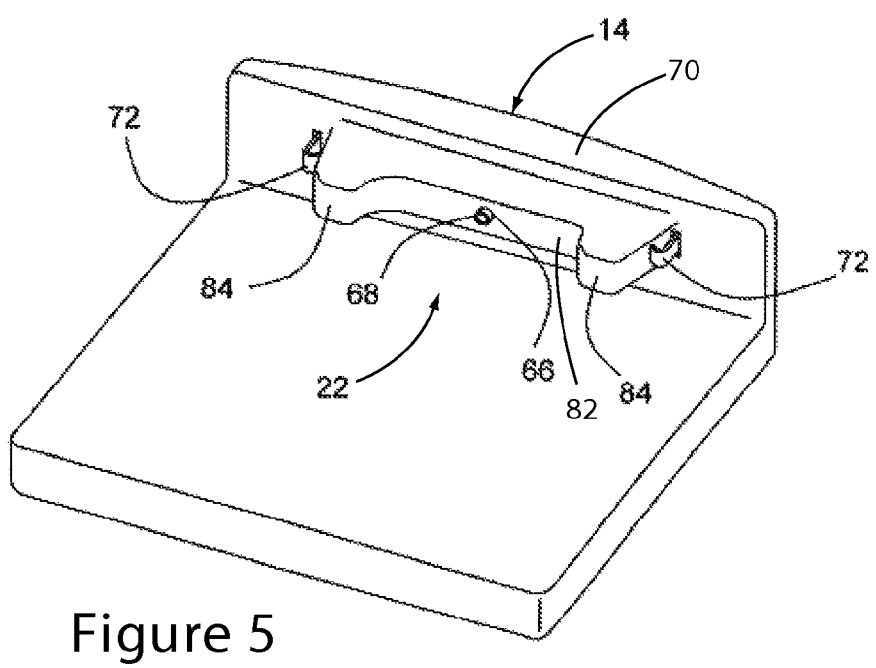
FIG. 5 is bottom perspective view of the accessory device of FIG. 1 showing a accessory device portion of the mechanically energized electromagnetic service connector system.

Referring to FIGS. 4 and 5, host electromagnetic service connector component 20 may include a mechanically actuated electromagnetic service switch 24 that may be selectively actuated to establish an electromagnetic service pathway between host 12 and accessory device 14 when accessory device 14 is coupled to host 12. In addition, host electromagnetic service connector component 20 and device electromagnetic service connector component 22 may also provide a mechanism for mechanically securing accessory device 14 to host 12, described below.

Electromagnetic service switch 24 may be enclosed within a housing 25 of the host. Housing 25 may be an integral part of host 12 or may be a separate component. For purposes of discussion, housing 25 is illustrated as an integral part of host 12. Electromagnetic service switch 24 is movable between an open position (see FIG. 7) and closed position (see FIG. 8) to enable an electromagnetic service to be selectively transferred between host 12 and accessory device 14 when accessory device 14 is coupled to host 12. Electromagnetic service switch 24 is generally disposed in the open position when accessory device 14 is decoupled from host 12.

Figure 6:
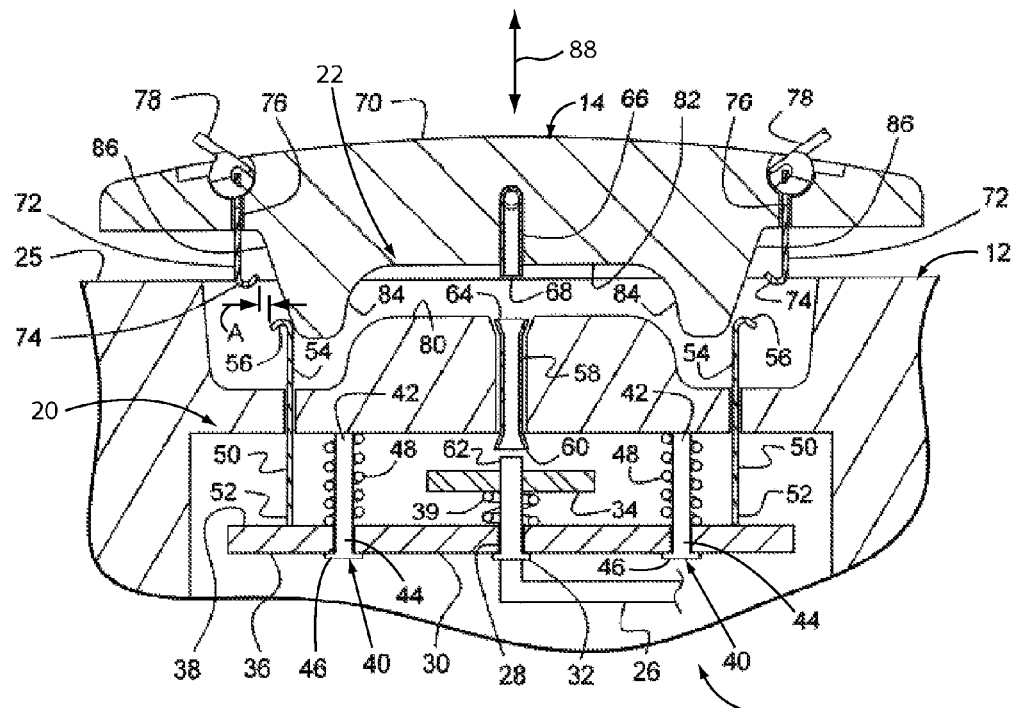
FIG. 6 is a partial cross-sectional view of the mechanically energized electromagnetic service connector system of FIG. 1 showing the accessory device portion of the electromagnetic service connector system positioned for engagement with the host portion of the electromagnetic service connector system.
Figure 7:
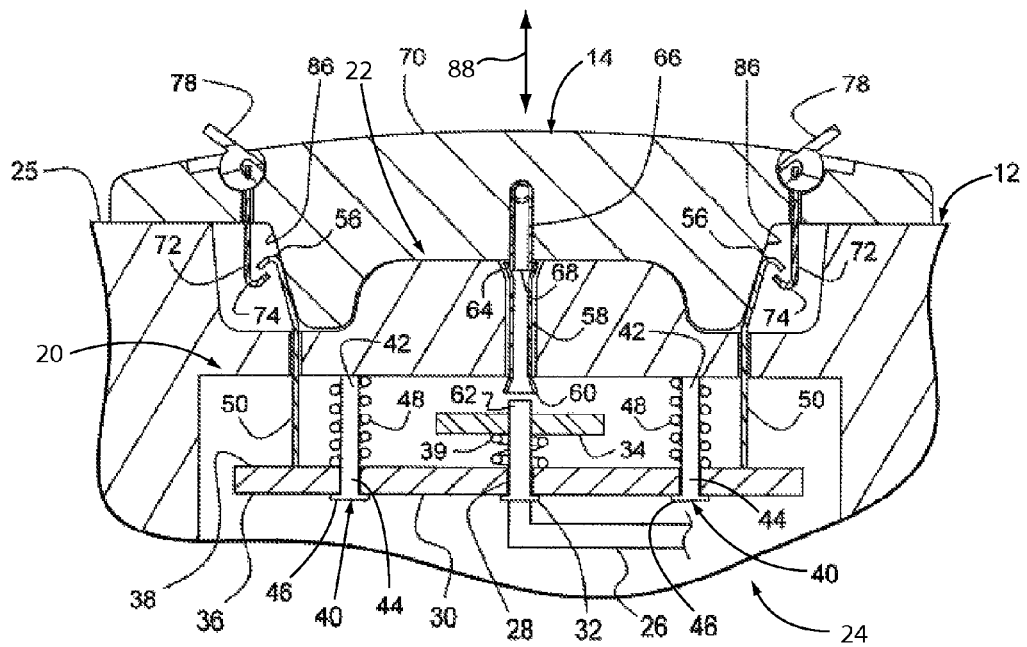
FIG. 7 is a partial cross-sectional view similar to FIG. 6, showing the accessory device portion of the electromagnetic service connector system engaged with the host portion of the electromagnetic service connector system, the electromagnetic service connector system arranged in an unlatched state.
Figure 8:
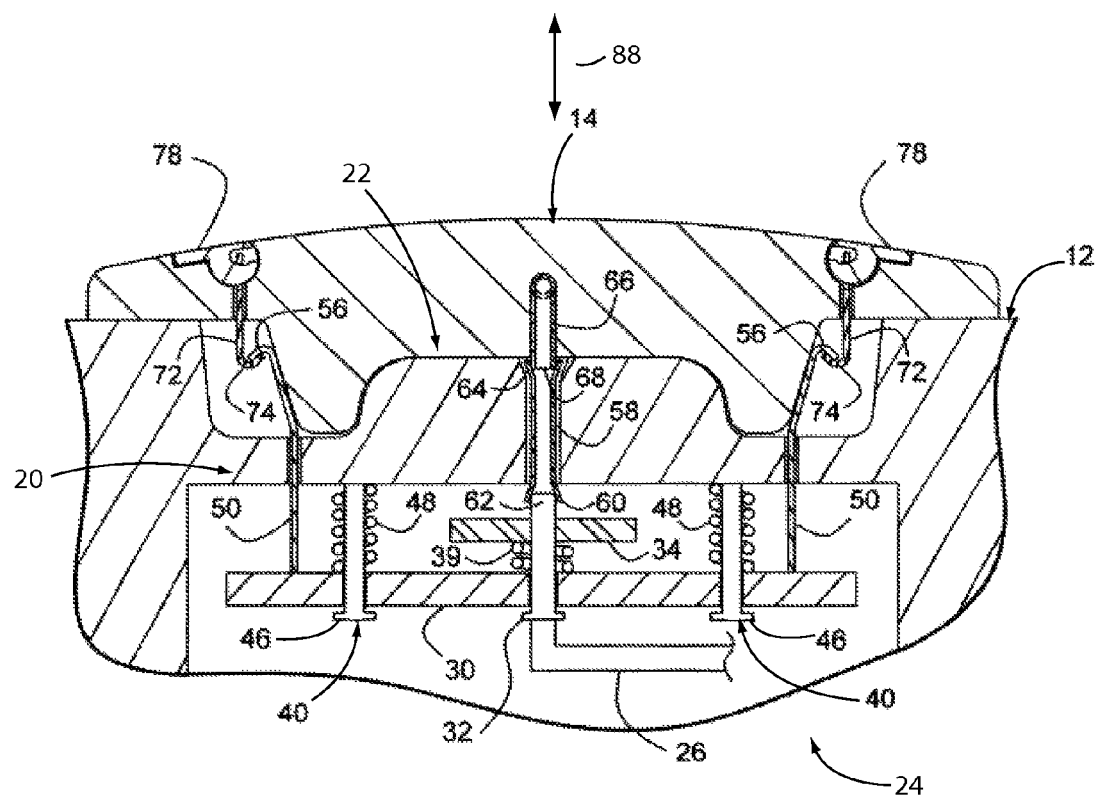
FIG. 8 is a partial cross-sectional view of similar to FIG. 6, showing the accessory device portion of the electromagnetic service connector system engaged with the host portion of the electromagnetic service connector system, the electromagnetic service connector system arranged in a latched state.

Referring to FIGS. 6 through 8 generally, host electromagnetic service connector component 20 may include a host electromagnetic service line 26 operable for transferring an electromagnetic service to and from host 12. For purposes of discussion, host electromagnetic service line 26 is illustrated generically as tube-like structure. The generically illustrated configuration is not intended to depict any particular configuration, but rather schematically represents a variety of potentially different configurations. In practice, the actual configuration will likely vary depending on, at least in part, the type of electromagnetic service being transferred, packaging requirements, and manufacturing considerations. For example, host electromagnetic service line 26 may be configured as an electrical wire or cable, when the electromagnetic service being transported is electric power, or as an electrical wire, electrical cable, or fiber optic cable, when the electromagnetic service being transported is electronic data. These, of course, are merely examples of the various configurations that host electromagnetic service line 26 may include depending on the electromagnetic service involved. Nevertheless, it shall be appreciated that host electromagnetic service line 26 may include other configurations to accommodate various design considerations, including but not limited to, the type of electromagnetic service being provided.

Host electromagnetic service line 26 slidably engages an orifice 28 extending through a switch plate 30. Orifice 28 may be sized to be slightly larger than host electromagnetic service line 26 to allow switch plate 30 to move freely along a length of host electromagnetic service line 26.

Extending from an outer surface of host electromagnetic service line 26 is one or more first stop(s) 32. First stop 32 is disposed adjacent a lower surface 36 of switch plate 30. Extending from an outer surface of the orifice 28 is one or more second stop(s) 34. Second stop 34 is spaced from an upper surface 38 of switch plate 30. Stops 32, 34 may have any of a variety of configurations, including, but not limited to, a radially extending flange, a radially extending pin, and a boss. Stops 32, 34 may be integrally formed with host electromagnetic service line 26 and orifice 28, respectively, or may be fixedly attached thereto, such as by welding, brazing, gluing, or any other suitable fixing method.

A biasing member 39 may be disposed between second stop 34 and upper surface 38 of switch plate 30. Biasing member 39 operates to urge switch plate 30 away from second stop 34 and into contact with first stop 32.

Switch plate 30 is slidably mounted to at least one guide rod 40. As illustrated herein, switch plate 30 is slidably mounted to two spaced guide rods 40. One end 42 of guide rod 40 may be fixedly attached to housing 25. An opposite end 44 of guide rod 40 may include a stop 46, which may be sized larger than end 44 to prevent switch plate 30 from traveling past the stop 46. A biasing member, such as springs 48, may be disposed between housing 25 and switch plate 30 to urge switch plate 30 toward stop 46.

Operation of electromagnetic service switch 24 may be controlled by at least one host actuating link 50 having an end 52 fixedly attached to switch plate 30. An opposite end 54 of host actuating link 50 extends through housing 25 and is accessible from outside the housing 25. Sufficient clearance is provided between host actuating link 50 and housing 25 to allow host actuating link 50 to move freely in and out of the housing 25. Host actuating link 50 may be constructed of a flexible material having a relatively high modulus of elasticity, such as spring steel, or another generally flexible material having similar mechanical properties. End 54 of host actuating link 50 may include a hook-shaped portion 56 for enabling host actuating link 50 to connect to a corresponding device actuating link, described below, and associated with accessory device 14.

Host electromagnetic service connector component 20 further includes a first electromagnetic service connection component, such as electromagnetic service receptacle 58, that extends through housing 25. One end 60 of electromagnetic service receptacle 58 is disposed adjacent an end 62 of host electromagnetic service line 26, and an opposite end 64 is accessible from outside of housing 25. End 60 of electromagnetic service receptacle 58 operably engages end 62 of host electromagnetic service line 26 when electromagnetic service switch 24 is in a closed position, as shown in FIG. 8. Exposed end 64 of electromagnetic service receptacle 58 operably engages a corresponding electromagnetic service connector component of accessory device 14 when the accessory device is coupled to host 12. Electromagnetic service receptacle 58 provides a pathway for transferring an electromagnetic service between accessory device 14 and host electromagnetic service line 26 of host 12. Similar to host electromagnetic service line 26, electromagnetic service receptacle 58 is illustrated generically as a tube-like structure, and is not intended to depict any particular configuration. In practice, electromagnetic service receptacle 58 may have a variety of potentially different configurations depending on the type of electromagnetic service being transferred, as well as other design considerations.

Referring to FIGS. 4 through 6, device electromagnetic service connector component 22 may be integrally formed with accessory device 14 or may be an add-on component. For purposes of discussion, device electromagnetic service connector component 22 is shown integrally formed with accessory device 14. When configured as an add-on component, device electromagnetic service connector component 22 may also function as an adapter to enable a host and a accessory device having dissimilar electromagnetic service connector components to be indirectly coupled to one another. Device electromagnetic service connector component 22 may be removable or non-removable from accessory device 14. Device electromagnetic service connector component 22 may be configured to transfer or receive a single electromagnetic service or multiple electromagnetic services.

Device electromagnetic service connector component 22 may include a second electromagnetic service connection component, such as an electromagnetic service plug 66, operable for transferring an electromagnetic service to and from accessory device 14. Electromagnetic service plug 66 may include an exposed end 68 that may be operably coupled to exposed end 64 of electromagnetic service receptacle 58 when accessory device 14 is coupled to host 12. End 68 is accessible from outside a housing 70 of accessory device 14.

Similar to host electromagnetic service line 26 and electromagnetic service receptacle 58, electromagnetic service plug 66 is illustrated generically as a tube-like structure. The generically illustrated configuration is not intended to depict any particular configuration, but rather schematically represents a variety of potentially different configurations that may vary depending on the type of electromagnetic service being transferred, as well as other design considerations. In practice, the actual configuration may vary depending on, at least in part, the type of electromagnetic service being transferred, packaging requirements, and manufacturing considerations.

Device electromagnetic service connector component 22 may include at least one device actuating link 72 that may connect to host actuating link 50 of host electromagnetic service connector component 20 when accessory device 14 is coupled to host 12. Device actuating link 72 may include a hook-shaped portion 74 that may be coupled to the correspondingly hook-shaped portion 56 of host actuating link 50. An end 76 of device actuating link 72 opposite the hook-shaped portion 74 may be operably connected to a toggle switch 78, or similar device. Toggle switch 78 may be moved between a latched position, shown in FIG. 8, and an unlatched position, shown in FIGS. 4, 6, and 7. Moving toggle switch 78 from the unlatched to the latched position retracts device actuating link 72. Moving toggle switch 78 from the latched position to the unlatched position causes device actuating link 72 to be extended. Device actuating link 72 may be constructed of a similar material as host actuating link 50.

Host electromagnetic service connector component 20 and device electromagnetic service connector component 22 may include various features to facilitate coupling of accessory device 14 to host 12. For example, host electromagnetic service connector component 20 may include a raised boss 80 that may engage a corresponding recess 82 of device electromagnetic service connector component 22. A raised ridge 84 at least partially defines an outer boundary of recess 82. Alignment features such as raised boss 80 and recess 82 may assist with positioning of device electromagnetic service connector component 22 relative to host electromagnetic service connector component 20 prior to engagement, and may also function to minimize lateral movement of accessory device 14 relative to host 12 when device electromagnetic service connector component 22 is coupled to host electromagnetic service connector component 20. It shall be appreciated, however, that the illustrated configuration is merely one example of the type of features that may be incorporated into host electromagnetic service connector component 20 and device electromagnetic service connector component 22 to aide alignment and coupling of consumer devise 14 to host 12. In practice, other configurations may also be employed to accommodate various design considerations of a particular application.

Referring to FIGS. 6 though 8, to facilitate coupling and decoupling of device actuating link 72 with host actuating link 50, device actuating link 72 may be offset laterally relative to host actuating link 50 to allow hook-shaped portion 74 of device actuating link 72 to clear hook-shaped portion 56 of the host actuating link 50 when accessory device 14 is attached to host 12. For example, referring particularly to FIG. 6, with accessory device 14 positioned for engagement with host 12, hook-shaped portion 56 of host actuating link 50 is initially offset a distance "A" from hook-shaped portion 74 of device actuating link 72. As device electromagnetic service connector component 22 is moved into engagement with host electromagnetic service connector component 20, hook-shaped portion 56 of host actuating link 50 engages an inclined surface 86 of ridge 84, as shown in FIG. 7. Surface 86 is inclined relative to an engagement path denoted by arrow 88. Arrow 88 depicts a path along which accessory device 14 may be moved when coupling and decoupling accessory device 14 to and from host 12. Further movement of device electromagnetic service connector component 22 toward host electromagnetic service connector component 20 causes hook-shaped portion 56 of host actuating link 50 to travel along inclined surface 86, which in turn elastically displaces hook-shaped portion 56 of host actuating link 50 toward end 74 of device actuating link 72. With device electromagnetic service connector component 22 fully engaged with host electromagnetic service connector component 20 (see FIG. 7), hook-shaped portion 56 of host actuating link 50 is sufficiently displaced from its decoupled position (as shown in FIG. 6) so as to axially overlap hooked-shaped portion 74 of device actuating link 72. The process is reversed when disengaging accessory device 14 from host 12. As device electromagnetic service connector component 22 is disengaged from host electromagnetic service connector component 20, hook-shaped portion 56 of host actuating link 50 slides along inclined surface 86 and is moved out of alignment with hooked-shaped portion 74 of device actuating link 72, as shown in FIG. 6.

The process of coupling and decoupling accessory device 14 with host 12 will now be described. Coupling of accessory device 14 to host 12 may be accomplished by positioning accessory device 14 adjacent host 12 in such a manner that device electromagnetic service connector component 22 is generally aligned with host electromagnetic service connector component 20, as shown in FIG. 6. Device electromagnetic service connector component 22 and host electromagnetic service connector component 20 may be coupled by generally moving accessory device 14 toward host 12 along a path denoted by arrow 88 until the two members are fully seated, as shown in FIG. 7. With device electromagnetic service connector component 22 fully engaging host electromagnetic service connector component 20, end 68 of electromagnetic service plug 66 operably engages end 64 of electromagnetic service receptacle 58. However, since electromagnetic service switch 24 has not yet been activated, the electromagnetic service path between accessory device 14 and host 12 remains open.

Electromagnetic service switch 24 may be activated by moving toggle switch 78 to the latched position, as shown in FIG. 8. Doing so causes hook-shaped portion 74 of device actuating link 72 to engage hook-shaped portion 56 of host actuating link 50, which in turn results in host actuating link 50 being pulled toward accessory device 14 by device actuating link 72. Switch plate 30 is pulled along with device actuating link 72 and host actuating link 50 toward electromagnetic service receptacle 58, causing end 62 of host electromagnetic service line 26 to operably engage end 60 of electromagnetic service receptacle 58, thereby opening an electromagnetic service pathway between accessory device 14 and host 12. Once end 62 of host electromagnetic service line 26 engages end 60 of electromagnetic service receptacle 58, any further movement of switch plate 30 toward electromagnetic service receptacle 58 will result in switch plate 30 being displaced axially away from stop 32 of host electromagnetic service line 26. This in turn compresses biasing member 39, which exerts a coupling force for maintaining the connection between host electromagnetic service line 26 and electromagnetic service receptacle 58.

Accessory device 14 may be decoupled from host 12 by reversing the previously described process for coupling the two devices. For example, electromagnetic service switch 24 may be moved to the open position by cycling toggle switch 78 from the latched position (see FIG. 8) to the unlatched position, as shown in FIG. 7. Doing so extends device actuating link 72 and allows biasing member 48 to move switch plate 30 toward stop 46 of guide rod 40. Switch plate 30 eventually contacts stop 32 of host electromagnetic service line 26. Further movement of switch plate 30 away from electromagnetic service receptacle 58 causes end 62 of host electromagnetic service line 26 to disengage end 60 of electromagnetic service receptacle 58, thereby interrupting the electromagnetic service path between accessory device 14 and host 12 (see FIG. 7). Switch plate 30 stops moving upon contacting stop 46 of guide rod 40. Once toggle switch 78 has been moved to the unlatched position, accessory device 14 may be removed from host 12 by withdrawing accessory device 14 from host 12 along a path generally parallel to path denoted by arrow 88.

Figure 9:
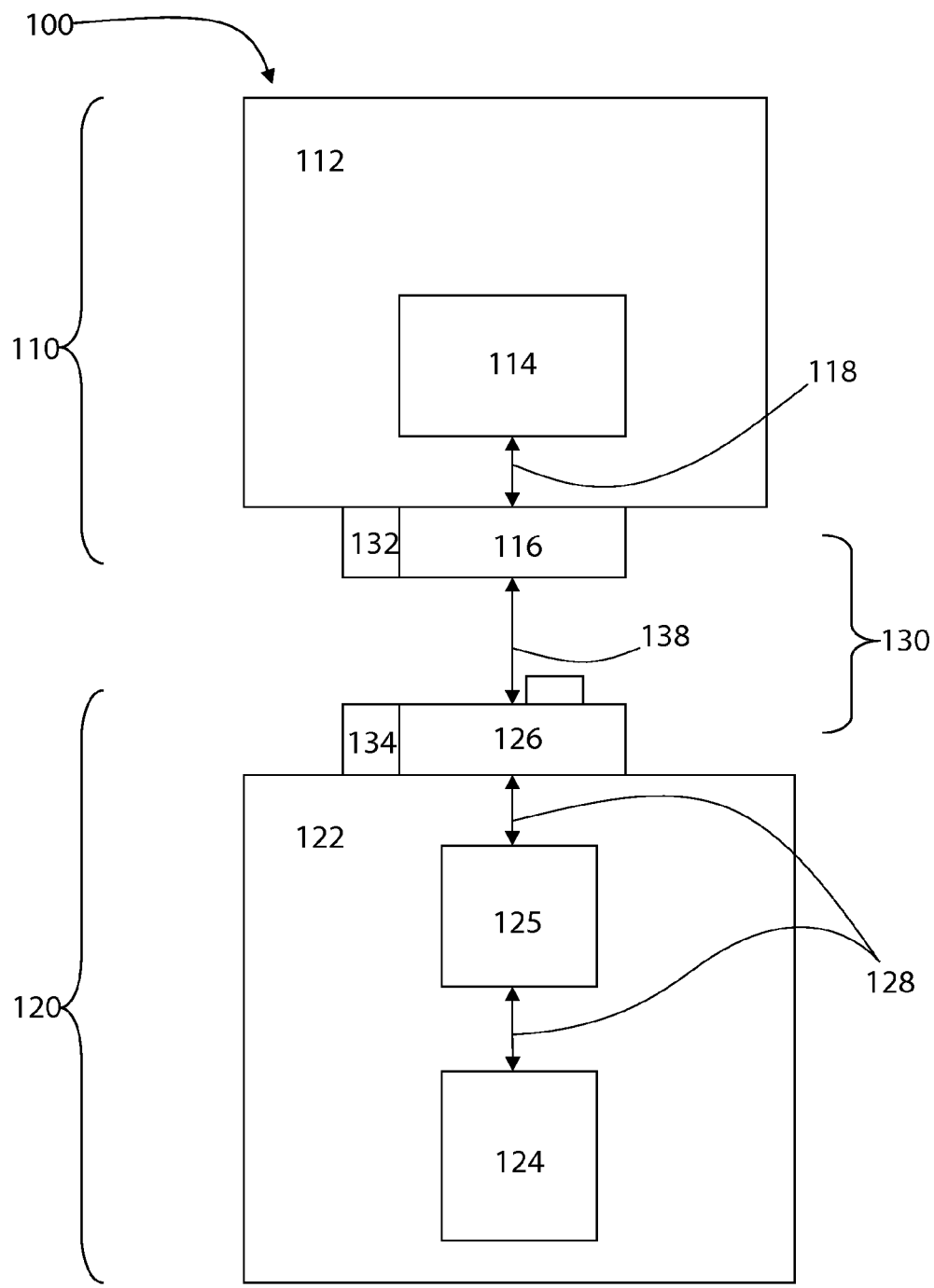
FIG. 9 is a generalized schematic view showing an electromagnetic service supply and consumption system.

Referring now to FIG. 9 a more general example of an electromagnetic service supply and consumption system 100 is schematically illustrated. A first subsystem 110 is connectable to a second subsystem 120 for selectively transferring an electromagnetic service between the first and second subsystems 110 and 120. As illustrated, first subsystem 110 may include a accessory device 112, such as a portable device, including an electromagnetic service consumer 114 connected to a first electromagnetic service connector component 116, such as a plug, by an electromagnetic service line 118. Second subsystem 120 may include a host 122, such as a refrigerator, including an electromagnetic service provider 124 connected to a second electromagnetic service connector component 126, such as a receptacle, through a switch 125 by electromagnetic service lines 128.

A connector system 130 includes first electromagnetic service connector component 116 and second electromagnetic service connector component 126 which are selectively interengageable. Switch components 132 and 134 are respectively associated with the first electromagnetic service connector component 116 and the second electromagnetic service connector component 126 to selectively activate the switch 125 when the first and electromagnetic service connector components 116 and 126 are engaged to permit the flow of the electromagnetic service from the electromagnetic service provider 124 to the second electromagnetic service connector component 126, then along an electromagnetic service line 138 between second electromagnetic service connector component 126 and first electromagnetic service connector component 116, and then along electromagnetic service line 118 to electromagnetic service consumer 114.

It will be appreciated that while host 122 is illustrated as including an electromagnetic service provider and accessory device 112 is illustrated as including an electromagnetic service consumer, accessory device 112 may, alternatively or additionally include an electromagnetic service provider and host 122 may alternatively or additionally, include an electromagnetic service consumer. It will further be appreciated that while first electromagnetic service connector component 116 is illustrated as being associated with electromagnetic service consumer 114 and second electromagnetic service connector component 126 is illustrated as being associated with electromagnetic service provider 124, it is contemplated that first electromagnetic service connector component 116 and second electromagnetic service connector component 126 may be male or female connector components so long as the components are capable of interengaging to permit the transfer of electromagnetic service therebetween.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for illustrating certain embodiments, and should in no way be construed to limit the claimed invention.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In summary, it should be understood that the invention is capable of modification and variation and is limited only by the following claims.

All defined terms used in the claims are intended to be given their broadest reasonable constructions consistent with the definitions provided herein. All undefined terms used in the claims are intended to be given their broadest reasonable constructions consistent with their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system for coupling with an electromagnetic service communicating device comprising:
    an electromagnetic service connector system comprising:
        an electromagnetic service receptacle;
        an electromagnetic service switch operably connected to an electromagnetic service source, the electromagnetic service switch operable for selectively transferring an electromagnetic service from the electromagnetic service source to the electromagnetic service receptacle;
        a first actuating link moveably associated with the electromagnetic service switch;
        an electromagnetic service plug operably connectable to the electromagnetic service receptacle; and
        a second actuating link moveably associated with the electromagnetic service plug and engageable with the first actuating link to selectively lock the electromagnetic service plug to the electromagnetic service receptacle;
    wherein the electromagnetic service switch is selectively activated to transfer an electromagnetic service from the electromagnetic service receptacle to the electromagnetic service plug in response to movement of the second actuating link to lock the electromagnetic service plug to the electromagnetic service receptacle.

2. The system according to claim 1, wherein the second actuating link is moveable between an extended position and a retracted position, wherein the electromagnetic service switch is activated to transfer the electromagnetic service from the electromagnetic service source to the electromagnetic service plug when the second actuating link is in the retracted position.

3. The system according to claim 2 and further comprising an electromagnetic service line for selectively transferring the electromagnetic service from the electromagnetic service source to the electromagnetic service receptacle, the electromagnetic service line movable between a first position in which the electromagnetic service line is operably coupled to the electromagnetic service receptacle and a second position in which the electromagnetic service line is operably decoupled from the electromagnetic service receptacle, wherein the electromagnetic service line is arranged in the second position when the electromagnetic service plug is unlocked from the electromagnetic service receptacle.

4. The system according to claim 3 and further comprising a biasing member connected to the electromagnetic service line, the biasing member operable for urging the electromagnetic service line toward the second position.

5. The system according to claim 2 and further comprising an electromagnetic service line for selectively transferring the electromagnetic service from the electromagnetic service source to the electromagnetic service receptacle, the electromagnetic service line connected to the first actuating link for concurrent movement therewith, wherein the electromagnetic service line is operably coupled to the electromagnetic service receptacle when the second actuating link is in the retracted position.

6. The system according to claim 5, wherein the electromagnetic service line is operably decoupled from the electromagnetic service receptacle when the second actuating link is in the extended position.

7. The system according to claim 5, wherein the electromagnetic service receptacle includes a first end enclosed within a housing and operably engageable with the electromagnetic service line, and a second end accessible from outside of the housing.

8. The system according to claim 1, wherein the electromagnetic service switch is deactivated to substantially block transmission of the electromagnetic service from the electromagnetic service source to the electromagnetic service receptacle when the first actuating link is detached from the second actuating link.

9. The system according to claim 1, wherein the electromagnetic service switch is deactivated to substantially block transmission of the electromagnetic service from the electromagnetic service source to the electromagnetic service receptacle when the electromagnetic service plug is unlocked from the electromagnetic service receptacle.

10. The system according to claim 1 and further comprising a host configured to communicate the electromagnetic service to the electromagnetic service connector system.

11. The system according to claim 10, wherein the host comprises at least one of a refrigerator, a freezer, a conventional oven, a microwave oven, a dishwashing machine, a stove, a range, an air conditioner, a dehumidifier, a clothes washing machine, a clothes dryer, a clothes refreshing machine, a non-aqueous washing apparatus, a water softener, a water heater, a furnace, pool water treatment equipment, an HVAC system, a thermostat, a blender, a mixer, a toaster, a coffee maker, a trash compactor, an air purifier, an iron, a vacuum cleaner, a robot, and a structural feature of a building.

12. The system according to claim 10 and further comprising an electromagnetic service consumer configured to communicate the electromagnetic service with the host.

13. A system for coupling with an electromagnetic service consumer comprising a first electromagnetic service connector component, the system comprising:
    a second electromagnetic service connector component operably engageable with the first electromagnetic service connector component for transferring an electromagnetic service from an electromagnetic service source to the first electromagnetic service connector component; and
    an electromagnetic service switch for selectively connecting the second electromagnetic service connector component to the electromagnetic service source, the electromagnetic service switch including a first actuating link engageable with a second actuating link associated with the first electromagnetic service connector component to selectively lock the first electromagnetic service connector to the second electromagnetic service connector component;
    wherein the electromagnetic service switch is activated to transfer an electromagnetic service from the electromagnetic service source to the second electromagnetic service connector component in response to movement of the second actuating link to lock the first electromagnetic service connector to the second electromagnetic service connector component.

14. The system according to claim 13 and further comprising an electromagnetic service line operably connected to the electromagnetic service source, wherein the second electromagnetic service connector component is selectively engageable with the electromagnetic service line for transferring the electromagnetic service from the electromagnetic service source to the second electromagnetic service connector component in response to movement of the first actuating link.

15. The system according to claim 14, wherein the first actuating link is operably connected to the electromagnetic service line.

16. The system according to claim 15, wherein the first actuating link is moveable between a first position in which the electromagnetic service line is operably coupled to the second electromagnetic service connector component, and a second position in which the electromagnetic service line is operably uncoupled from the second electromagnetic service connector component.

17. The system according to claim 16 and further comprising a biasing member connected to the electromagnetic service line for urging the electromagnetic service line toward the second position.

18. The system according to claim 13 and further comprising an electromagnetic service line operably connected to the electromagnetic service source.

19. The system according to claim 18, wherein the second electromagnetic service connector component includes a first end enclosed within a housing and selectively engageable with the electromagnetic service line, and a second end accessible from outside the housing, the second end being engageable with the first electromagnetic service connector component.

20. The system according to claim 18 and further comprising the electromagnetic service source for supplying the electromagnetic service to the first electromagnetic service connector component.

21. The system according to claim 18, wherein the electromagnetic service line is enclosed within a housing, and at least a portion of the first actuating link extends outside of the housing.

22. The system according to claim 18, wherein at least a portion of the second electromagnetic service connector component and the first actuating link are accessible from outside a housing enclosing, the electromagnetic service line.

23. The system according to claim 18, wherein the first actuating link is moveable between an extended position in which the electromagnetic service line is operably coupled to the second electromagnetic service connector component, and a retracted position in which the electromagnetic service line is operably uncoupled from the second electromagnetic service connector component.

24. The system according to claim 13, wherein the electromagnetic service comprises electrical power.

25. The system according to claim 13, wherein the electromagnetic service comprises data.

26. The system according to claim 13 and further comprising a host configured to communicate the electromagnetic service to the electromagnetic service consumer.

27. The system according to claim 26, wherein the host is one of a refrigerator, a freezer, a conventional oven, a microwave oven, a dishwashing machine, a stove, a range, an air conditioner, a dehumidifier, a clothes washing machine, a clothes dryer, a clothes refreshing machine, a non-aqueous washing apparatus, a water softener, a water heater, a furnace, pool water treatment equipment, an HVAC system, a thermostat, a blender, a mixer, a toaster, a coffee maker, a trash compactor, an air purifier, an iron, a vacuum cleaner, a robot, and a structural feature of a building.

28. An electromagnetic service connector component for receiving an electromagnetic service from a host, the electromagnetic service connector component comprising:
an electromagnetic service plug operably engageable with a separate second electromagnetic service connector component for selectively receiving an electromagnetic service from an electromagnetic service source; and
an actuator operably associated with the electromagnetic service plug, the actuator moveable along a path generally parallel to an axis of insertion of the electromagnetic service plug with the second electromagnetic service connector component, between a first position in which the electromagnetic service plug is locked to the second electromagnetic service connector component, and a second position in which the electromagnetic service plug is unlocked from the second electromagnetic service connector component, the actuator comprising:
at least one actuating link engageable with a corresponding actuating link associated with the second electromagnetic service connector component to selectively lock the electromagnetic service plug to the second electromagnetic service connector component; and
wherein the electromagnetic service is delivered to the electromagnetic service plug when the actuator is in the first position.

29. The electromagnetic service connector component according to claim 28, wherein the
at least one actuating link is moveable between an extended position and a retracted position, and the actuator further comprises
a switch operably connected to the at least one actuating link, the switch selectively moveable between a latched position for positioning the at least one actuating link in the retracted position, and an open position for positioning the at least one link in the extended position.

30. The electromagnetic service connector component according to claim 29, wherein the at least one actuating link includes a hook-shaped end engageable with the corresponding actuating link of the second electromagnetic service connector component.

31. The electromagnetic service connector component according to claim 29, wherein a longitudinal axis of the at least one actuating link is aligned substantially parallel to the axis of insertion.

32. The electromagnetic service connector component according to claim 29, wherein the at least one actuating link is moveable substantially parallel to a longitudinal axis of the at least one actuating link.

33. The electromagnetic service connector component according to claim 29, wherein the at least one actuating link comprises at least two actuating links, and the second electromagnetic service connector component is disposed between the at least two actuating links.

34. The electromagnetic service connector component according to claim 33 and further comprising an electromagnetic service consumer in communication with the second electromagnetic service connector component.

35. The electromagnetic service connector component according to claim 34 wherein the electromagnetic service consumer is at least one of a consumer electronic device, a client software device, a remote user interface, a source of consumer information, a reader, a sensor device, a smart utensil, an appliance, an additional smart coupling device, a remote controller, a network binder, a cycle accessory, a resource controller, a communicator, an access system, a payment system, a sales demonstration device, a consumable holder, a dispenser, a filter, a water filter, an air filter, a detergent dispenser, a drink dispenser, a media content holder, and an electromagnetic service device.

36. The electromagnetic service connector component according to claim 28, wherein the electromagnetic service comprises electrical power.

37. The electromagnetic service connector component according to claim 28, wherein the electromagnetic service comprises data.

38. An adapter for removably coupling a portable device having a first device electromagnetic service connector component to a host having an electromagnetic service provider, a first host electromagnetic service connector component, and an electromagnetic service switch selectively providing an electromagnetic service to the first electromagnetic service connector, the adapter comprising:

a second host electromagnetic service connector component engageable with the first host electromagnetic service connector component;

a second device electromagnetic service connector component engageable with the first device electromagnetic service connector component;

an electromagnetic service line operably interconnecting the second host electromagnetic service connector component and the second device electromagnetic service connector component for the transfer of an electromagnetic service therealong; and a first actuating link engageable with a second actuating link associated with the electromagnetic service switch to selectively lock the second host electromagnetic service connector component to the first host electromagnetic service connector component;

wherein the electromagnetic service switch is activated in response to movement of the first actuating link to lock the second host electromagnetic service connector component to the first host electromagnetic service connector component.

39. The adapter according to claim 38, wherein the first actuating link engages the second actuating link associated with the electromagnetic service switch when the second host electromagnetic service connector component engages the first host electromagnetic service connector.

\* \* \* \* \*

UNITED STATES PATENT AND TRADEMARK OFFICE
CERTIFICATE OF CORRECTION

| | | |
|---|---|---|
| PATENT NO. | : 8,151,016 B2 | Page 1 of 1 |
| APPLICATION NO. | : 12/643268 | |
| DATED | : April 3, 2012 | |
| INVENTOR(S) | : Richard A. McCoy | |

It is certified that error appears in the above-identified patent and that said Letters Patent is hereby corrected as shown below:

Col. 19, lines 33 - 36, Claim 22: "The system according to claim 18, wherein at least a portion of the second electromagnetic service connector component and the first actuating link are accessible from outside a housing enclosing, the electromagnetic service line." - should be
Claim 22: -- The system according to claim 18, wherein at least a portion of the second electromagnetic service connector component and the first actuating link are accessible from outside a housing enclosing the electromagnetic service line. --

Signed and Sealed this
Sixteenth Day of October, 2012

David J. Kappos
*Director of the United States Patent and Trademark Office*